United States Patent
Chou et al.

(10) Patent No.: US 8,205,505 B2
(45) Date of Patent: Jun. 26, 2012

(54) PRESSURE TESTING DEVICE

(75) Inventors: Ming-Hung Chou, Xinyi District (TW);
Ching-Feng Hsieh, Wanhua District (TW)

(73) Assignee: Askey Computer Corporation, Taipei (TW)

( * ) Notice: Subject to any disclaimer, the term of this patent is extended or adjusted under 35 U.S.C. 154(b) by 80 days.

(21) Appl. No.: 12/962,173

(22) Filed: Dec. 7, 2010

(65) Prior Publication Data

US 2012/0103103 A1    May 3, 2012

(30) Foreign Application Priority Data

Nov. 2, 2010    (TW) ............................. 99137585 A

(51) Int. Cl.
*G01L 9/00*    (2006.01)

(52) U.S. Cl. ........................................... 73/753; 73/756
(58) Field of Classification Search ............. 73/700–756
See application file for complete search history.

(56) References Cited

U.S. PATENT DOCUMENTS

| | | | | |
|---|---|---|---|---|
| 6,125,710 A | * | 10/2000 | Sharp | 73/863.31 |
| 6,761,742 B2 | * | 7/2004 | Caspers | 623/34 |
| 7,036,359 B2 | * | 5/2006 | Hayakawa et al. | 73/114.39 |
| 7,363,803 B2 | * | 4/2008 | Hayakawa et al. | 123/499 |
| 2008/0163675 A1 | * | 7/2008 | Hsu | 73/40 |
| 2011/0015593 A1 | * | 1/2011 | Svedman et al. | 604/319 |

* cited by examiner

*Primary Examiner* — Andre Allen

(57) ABSTRACT

A pressure testing device includes: a vacuum pump having positive and negative pressure terminals; a first solenoid valve having a first intake terminal and a first exhaust terminal connected to the negative pressure terminal; a second solenoid valve having a second exhaust terminal and a second intake terminal connected to the positive pressure terminal; a pressure sensor having one end connected to the first intake terminal and the second exhaust terminal and the other end connected to a pressure testing terminal of an object; an operation module for displaying an operation interface to input pressure testing parameters; and a control unit for performing an air-extracting process through the vacuum pump and first solenoid valve or an air-exhausting process through the vacuum pump and second solenoid valve to the object according to the inputted parameters and displaying the state of the object sensed by the pressure sensor through the operation module.

10 Claims, 5 Drawing Sheets

PRESSURE TESTING DEVICE

This application claims priority to Taiwanese Application No. 99137585, filed on Nov. 2, 2010, which is incorporated by reference in its entirety.

BACKGROUND OF THE INVENTION

1. Field of the Invention

The present invention relates to pressure testing devices, and more particularly, to a pressure testing device capable of producing stable positive and negative pressure sources and testing the pressure state of an object.

2. Description of Related Art

Currently, a variety of electronic products have a waterproof or moisture-proof function, such as waterproof digital watches, waterproof mobile phones, waterproof digital cameras and so on, and more and more electronic products are desired to have a waterproof or moisture-proof function.

Generally, a waterproof or moisture-proof test is performed to an object by disposing the object in water or applying an air pressure on junctions between components of the object, wherein the air pressure is used to simulate a water pressure. For example, a negative pressure or a positive pressure can be applied on the junctions and a pressure sensor can be used to sense the pressure that is maintained by the object. Once the object cannot maintain a certain degree of pressure, it represents that the object is leaking air and has poor waterproof or moisture-proof performance.

To perform the above-described test method, devices for producing negative and positive pressures are required. Generally, a vacuum pump is necessary for producing a negative pressure and an air compressor is necessary for producing a positive pressure. However, the use of the two types of devices is costly and space-consuming. Therefore, it is desirable to develop a simplified testing device capable of producing both positive and negative pressures.

Further, the accuracy of air pressure produced by the air compressor is lower than the vacuum pump. Therefore, in a conventional positive pressure test, it is quite difficult to accurately regulate the positive pressure applied on an object under test.

SUMMARY OF THE INVENTION

Accordingly, the present invention provides a pressure testing device capable of producing stable negative and positive pressure sources and testing the pressure state of an object.

The present invention also aims to provide a pressure testing device that allows the tester to set required testing parameters so as to improve and simplify testing processes and improve the accuracy of testing results, and facilitates the verifier to verify data obtained from the testing process and integrate the data for further analysis.

In order to achieve the above and other objects, the present invention provides a pressure testing device for performing one of a positive pressure test and a negative pressure test to an object at a pressure testing terminal thereof according to pressure testing parameters. The device comprises: a vacuum pump having a negative pressure terminal and a positive pressure terminal for extracting air at the negative pressure terminal and exhausting air at the positive pressure terminal; a first solenoid valve having a first intake terminal and a first exhaust terminal, wherein the first exhaust terminal is connected to the negative pressure terminal of the vacuum pump; a second solenoid valve having a second intake terminal and a second exhaust terminal, wherein the second intake terminal is connected to the positive pressure terminal of the vacuum pump; a pressure sensor having one end connected to the first intake terminal of the first solenoid valve and the second exhaust terminal of the second solenoid valve and the other end connected to the pressure testing terminal of the object, the pressure sensor being used for transferring one of pressures produced at the first intake terminal and the second exhaust terminal to the pressure testing terminal and sensing the pressure state of the object through the pressure testing terminal; an operation module for displaying an operation interface to input the pressure testing parameters; and a control unit electrically connected to the vacuum pump, the first solenoid valve, the second solenoid valve, the pressure sensor and the operation module for performing one of the positive pressure test and the negative pressure test to the object according to the pressure testing parameters received by the operation module, wherein, if the pressure testing parameters belong to a negative pressure test, the control unit controls the vacuum pump and the first solenoid valve to perform an air-extracting process to the object and controls the operation module to display on the operation interface the pressure state of the object sensed by the pressure sensor, on the other hand, if the pressure testing parameters belong to a positive pressure test, the control unit controls the vacuum pump and the second solenoid valve to perform an air-exhausting process to the object and controls the operation module to display on the operation interface the pressure state of the object sensed by the pressure sensor.

The pressure testing device of the present invention is capable of producing stable positive and negative pressure sources so as to provide positive and negative pressure tests. That is, such a pressure testing device provides two kinds of functions that conventionally require different kinds of devices, thereby saving costs and spaces and facilitating tests. Further, the pressure testing device of the present invention provides an operation interface that facilitates the user to set testing parameters and obtain testing results and also provides a storage function for storing testing results so as for the verifier to verify and analyze the testing results.

DETAILED DESCRIPTION OF PREFERRED EMBODIMENTS

The following illustrative embodiments are provided to illustrate the disclosure of the present invention, these and other advantages and effects can be apparent to those in the art after reading this specification.

Figure 1:
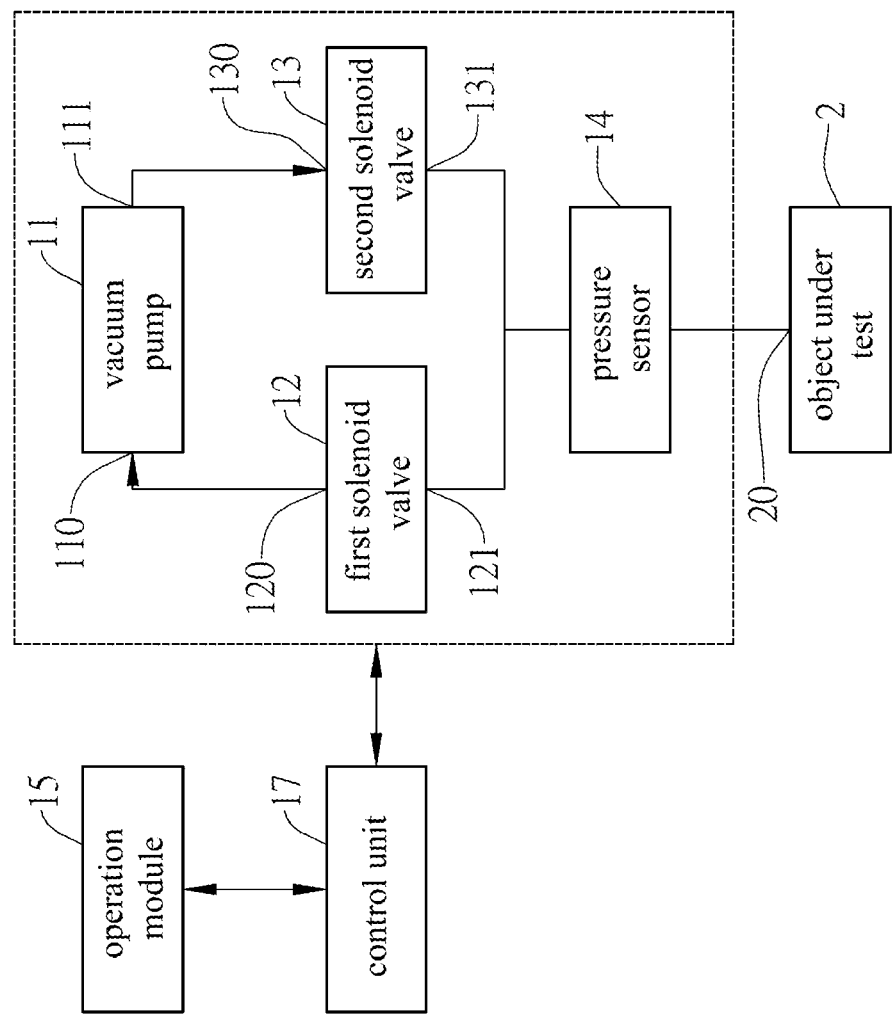
FIG. 1 is a schematic block diagram illustrating the basic architecture of a pressure testing device of the present invention.

FIG. 1 is a schematic block diagram illustrating the basic architecture of a pressure testing device of the present invention. The pressure testing device of the present invention is capable of providing stable positive and negative pressure sources so as to perform a positive pressure test or a negative pressure test to an object 2 at a pressure testing terminal 20 thereof according to pressure testing parameters. Referring to FIG. 1, the pressure testing device comprises: a vacuum pump 11; a first solenoid valve 12; a second solenoid valve 13, a pressure sensor 14, an operation module 15 and a control unit 17.

Therein, the vacuum pump 11 has a negative pressure terminal 110 and a positive pressure terminal 111. The vacuum pump 11 can extract air at the negative pressure terminal 110 and exhaust air at the positive pressure terminal 111.

The first solenoid valve 12 has a first exhaust terminal 120 and a first intake terminal 121, wherein the first exhaust terminal 120 is connected to the negative pressure terminal 110 of the vacuum pump 11.

The second solenoid valve 13 has a second intake terminal 130 and a second exhaust terminal 131, wherein the second intake terminal 130 is connected to the positive pressure terminal 111 of the vacuum pump 11.

The pressure sensor 14 has one end connected to the first intake terminal 121 of the first solenoid valve 12 and the second exhaust terminal 131 of the second solenoid valve 13 and the other end connected to the pressure testing terminal 20 of the object 2 so as to transfer one of pressures produced at the first intake terminal 121 and the second exhaust terminal 131 to the pressure testing terminal 20 and sense the pressure state of the object 2 through the pressure testing terminal 20.

The operation module 15 is used for displaying an operation interface to input the above-described pressure testing parameters. The operation interface allows the tester to input desired pressure testing parameters according to the testing requirement. Further, after a pressure test, the corresponding testing result can be displayed on the operation interface.

The pressure testing parameters can be varied with the types of tests. For example, if the pressure testing parameters belong to a positive pressure test, the pressure testing parameters comprise at least one of the group consisting of an upper time limit for performing an air-exhausting process to the object, a target pressure value, time duration to maintain pressure after the air-exhausting process, and upper and lower pressure limit values for the object. On the other hand, if the pressure testing parameters belong to a negative pressure test, the pressure testing parameters comprise at least one of the group consisting of an upper time limit for performing an air-extracting process to the object, a target pressure value, time duration to maintain pressure after the air-extracting process, and upper and lower pressure limit values for the object.

The control unit 17 is electrically connected to the vacuum pump 11, the first solenoid valve 12, the second solenoid valve 13, the pressure sensor 14 and the operation module 15. For example, the control unit 17 can be a testing program written in a program language and stored in a memory, or an integrated circuit. The control unit 17 is used for performing a negative pressure test or a positive pressure test to the object 2 according to the pressure testing parameters received by the operation module 15.

Figure 2:
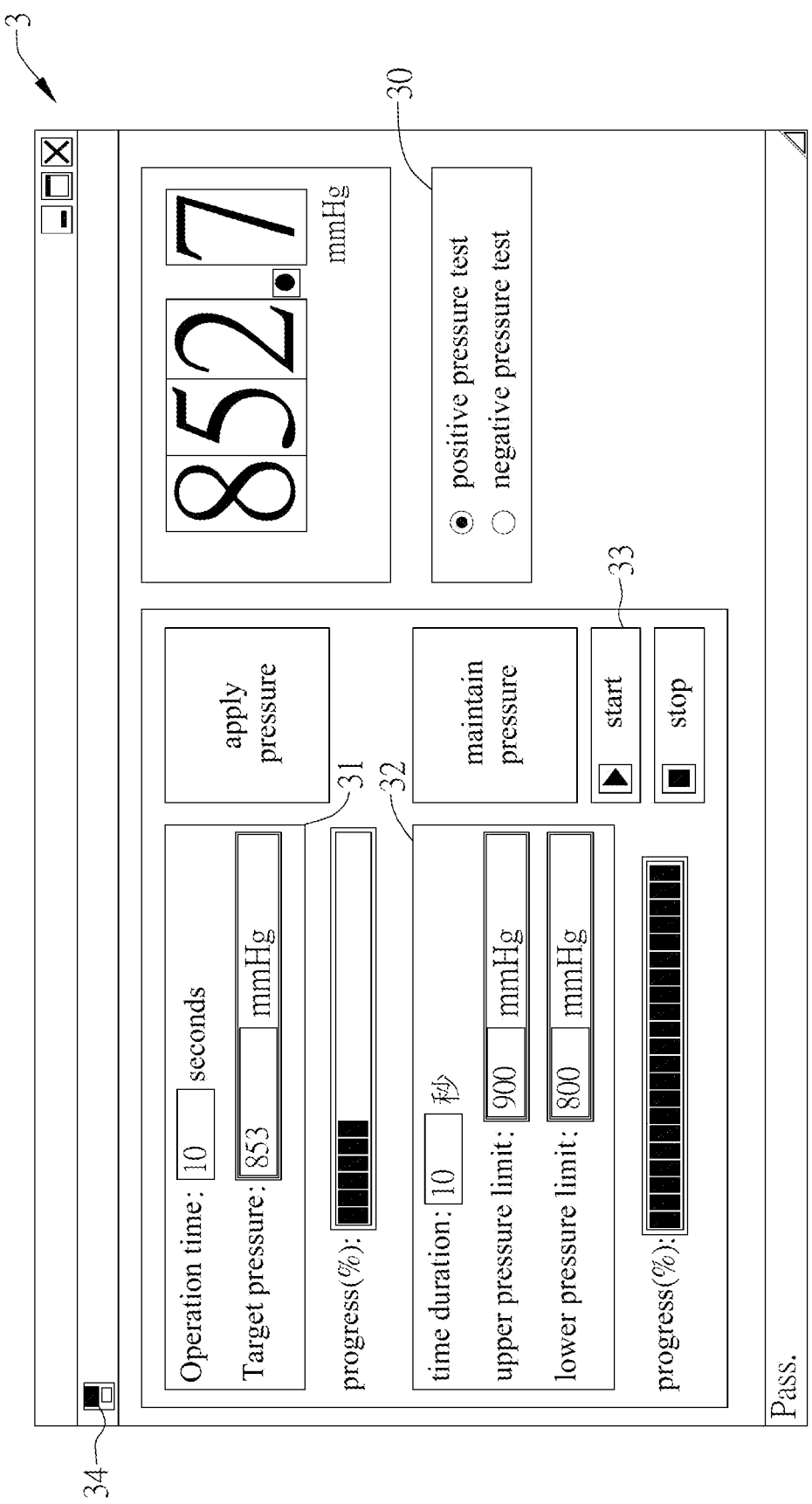
FIG. 2 is a schematic diagram illustrating an example of an operation interface according to the present invention.

FIG. 2 shows an example of the above-described operation interface. The user can choose a desired test in a box 30 of the operation interface 3. For example, if the user chooses to perform a positive pressure test, the user can set the pressure testing parameters for the positive pressure test. For example, the user can input an upper time limit for performing an air-exhausting process to the object and a target pressure value through a pressure testing parameter input box 31 of the operation interface 3. Further, the user can input such as time duration to maintain pressure after the air-exhausting process, and upper and lower pressure limit values for the object in a pressure maintaining parameter input box 3 of the operation interface 3.

After the user clicks a start button 33 of the operation interface 3, the control unit 17 controls the vacuum pump 11 and the second solenoid valve 13 to perform an air-exhausting process to the object according to the pressure testing parameters received through the operation interface 3, controls the pressure sensor 14 to sense the pressure state of the object 2 and causes the operation interface 3 to display the sensed pressure state. For example, the operation interface 3 displays at least one of the group consisting of the pressure state of the object after the air-exhausting process, the progress of the air-exhausting process, the progress for the object to maintain pressure after the air-exhausting process, and the testing result of succeeding or failing.

After the test, the user can click a save button 34 of the operation interface 3 to store the testing parameters and the testing result.

As shown in FIG. 2, a pressure value of 852.7 mmHg that is maintained by the object and sensed by the pressure sensor 14 is shown on the top right corner of the operation interface 3. Since the pressure value falls within the upper and lower pressure limits, i.e., 800 mmHg<852.7 mmHg<900 mmHg, it represents that the object passes the positive pressure test and accordingly a message of 'pass' is shown on the bottom left corner of the operation interface 3.

In a positive pressure test, it may occur that the pressure value of the object sensed by the pressure sensor 14 cannot reach the target pressure value within the upper time limit for performing the air-exhausting process to the object, i.e., within 10 seconds, it represents that the object is leaking air. Accordingly, a message of 'fail' is shown on the bottom left corner of the operation interface 3 and the test is ended without the need to perform a subsequent pressure maintaining step.

Further, if the user chooses to perform a negative pressure test, the control unit 17 controls the vacuum pump 11 and the first solenoid valve 12 to perform an air-extracting process to the object 2 and controls the pressure sensor 14 to sense the pressure state of the object 2 and causes the operation interface 3 to display the pressure state sensed by the pressure sensor 14 For example, the operation interface 3 displays at least one of the group consisting of the pressure state of the object after the air-extracting process, the progress of the air-extracting process, the progress for the object to maintain pressure after the air-extracting process, and the testing result of succeeding or failing.

Figure 3:
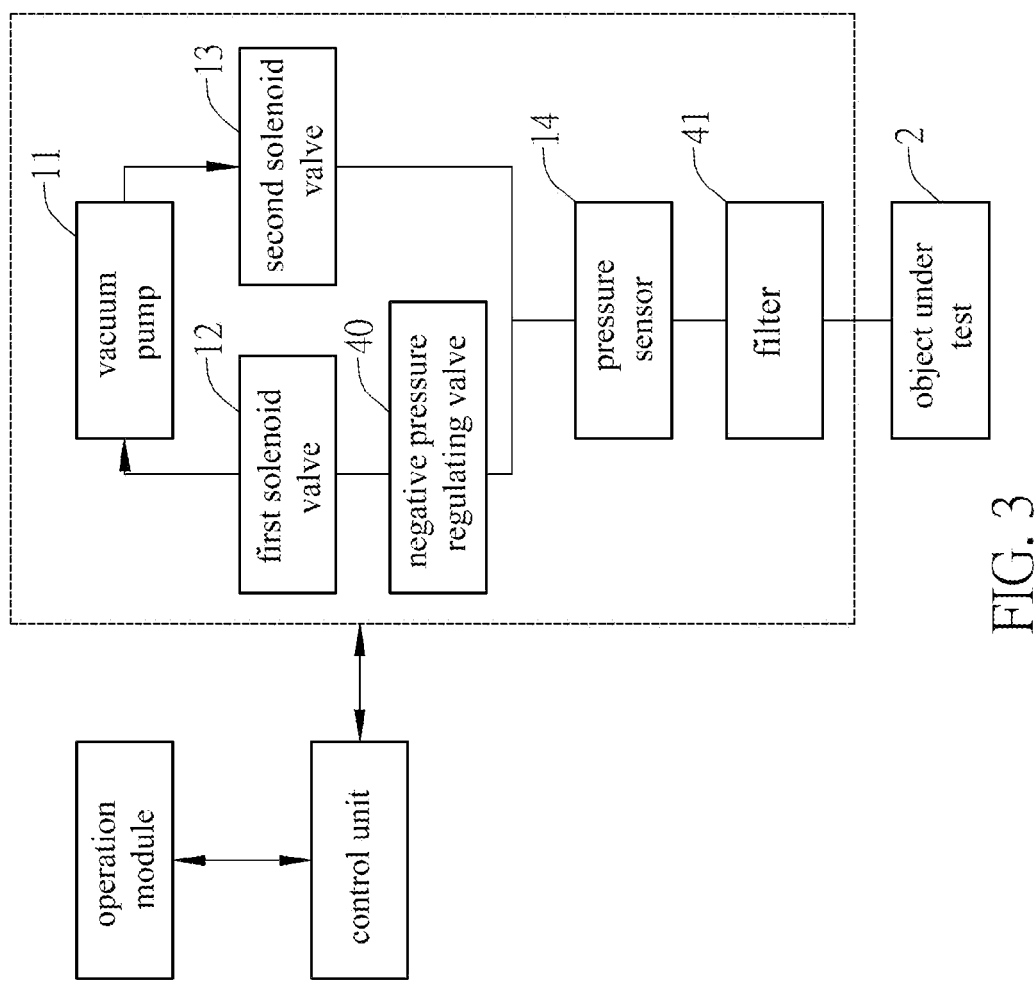
FIG. 3 is a schematic block diagram illustrating the basic architecture of a pressure testing device according to another embodiment of the present invention.

FIG. 3 shows the basic architecture of a pressure testing device according to another embodiment of the present invention. For the purpose of simplification, only the difference of the present embodiment from the embodiment of FIG. 1 is described herein. The pressure testing device of the present embodiment further comprises a negative pressure regulating valve 40 and a filter 41. Therein, the negative pressure regulating valve 40 is disposed in the air-extracting path formed between the first solenoid valve 12 and the pressure sensor 14 and electrically connected to the control unit 17 so as to regulate the negative pressure in the air-extracting path according to the pressure testing parameters. The negative pressure regulating valve 40 can be an electro-pneumatic proportional valve or a flow meter, which allows the negative pressure provided by the vacuum pump 11 to quickly reach the target pressure value set by the user.

The filter 41 is disposed between the pressure sensor 14 and the pressure testing terminal 20 for filtering out impurities such as moisture, oil and dust in the path between the pressure sensor 14 and the pressure testing terminal 20.

Figure 4:
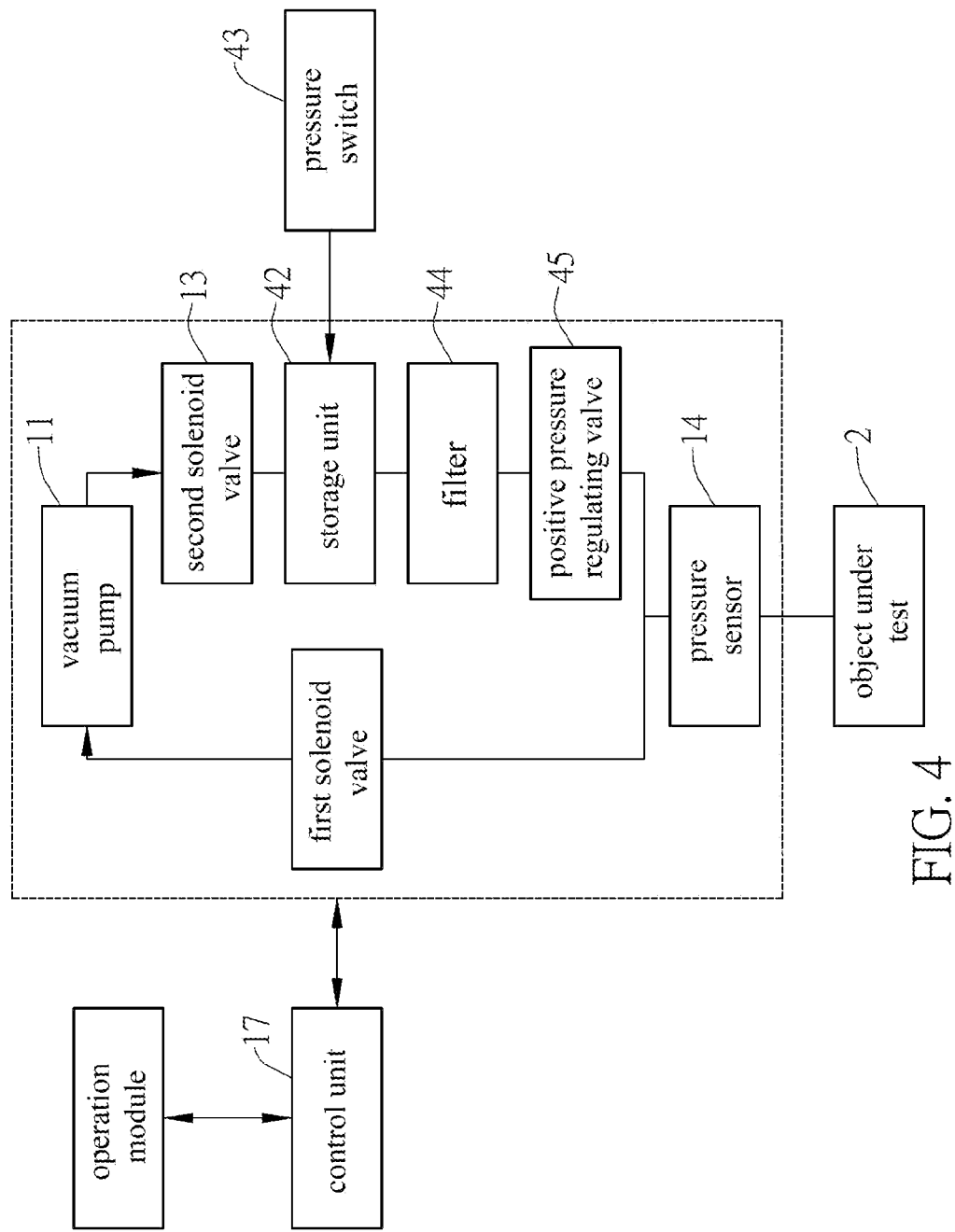
FIG. 4 is a schematic block diagram illustrating the basic architecture of a pressure testing device according to a further embodiment of the present invention.

FIG. 4 shows the basic architecture of a pressure testing device according to a further embodiment of the present invention. For the purpose of simplification, only the difference of the present embodiment from the embodiment of FIG. 1 is described herein. The pressure testing device of the present embodiment further comprises a storage unit 42, a pressure switch 43, a filter 44 and a positive pressure regulating valve 45. Therein, the storage unit 42, the filter 44 and the positive regulating valve 45 are disposed in the air-exhausting path formed between the second solenoid valve 13 and the pressure sensor 14 and electrically connected to the control unit 17.

The storage unit 42 is used for storing air exhausted from the vacuum pump 11 through the second solenoid valve 13 and performing an air-exhausting process so as to apply a positive pressure to the object 2. The pressure switch 43 is connected to the storage unit 42 and controlled by the control unit 17 for enabling or disabling an air exhaust from the vacuum pump 11 to the storage unit 42 according to the air pressure stored in the storage unit 42. In an alternative embodiment, the pressure switch 43 can automatically control an air exhaust from the vacuum pump 11 to the storage unit 42 according to the pressure stored in the storage unit 42.

The filter 44 is used to filter out impurities from the storage unit 42 when a positive pressure test is performed to the object 2.

The positive pressure regulating valve 45 is used for regulating the positive pressure in the air-exhausting path according to the pressure testing parameters. The positive pressure regulating valve 45 can be an electro-pneumatic proportional valve or a flow meter, which allows the positive pressure provided by the vacuum pump 11 to quickly reach the target pressure value set by the user.

Figure 5:
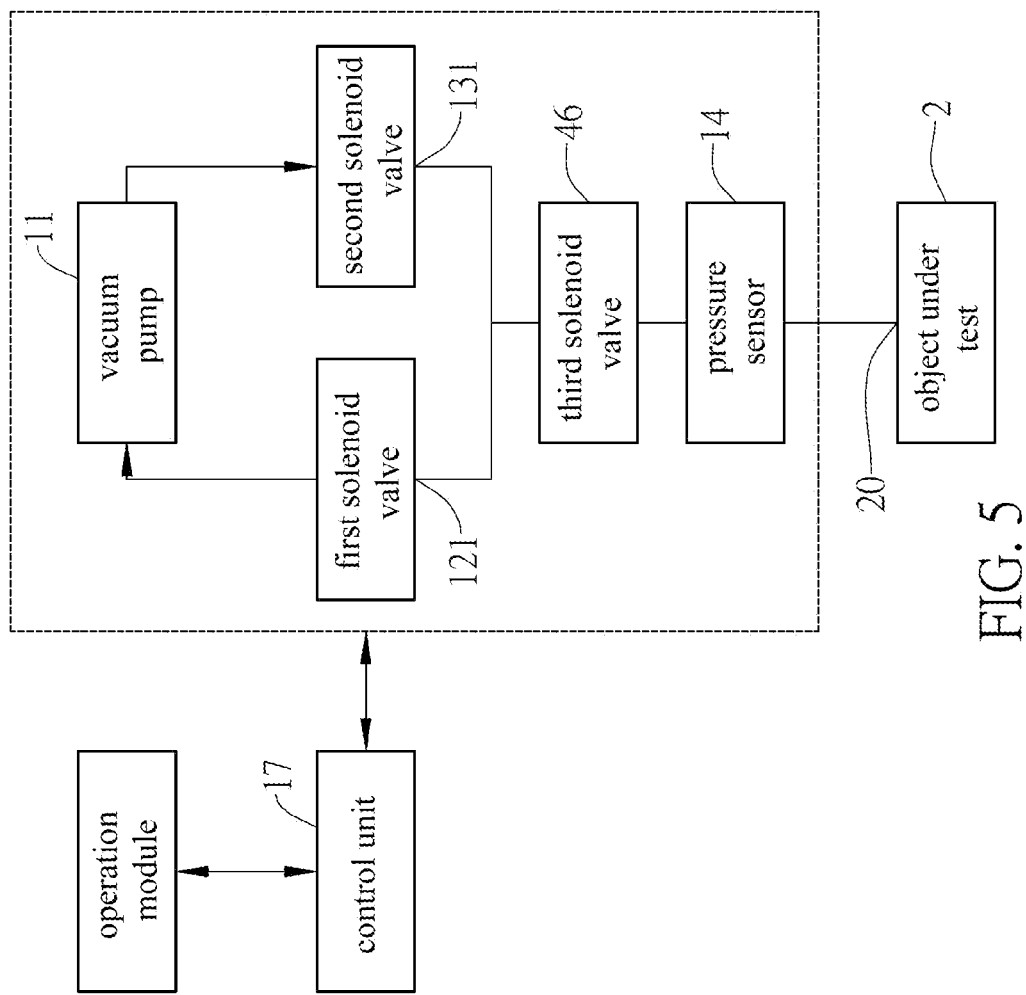
FIG. 5 is a schematic block diagram illustrating the basic architecture of a pressure testing device according to another embodiment of the present invention.

FIG. 5 shows the basic architecture of a pressure testing device according to another embodiment of the present invention. For the purpose of simplification, only the difference of the present embodiment from the embodiment of FIG. 1 is described herein. The pressure testing device of the present embodiment further comprises a third solenoid valve 46 with one end connected to the first intake terminal 121 of the first solenoid valve 12 and the second exhaust terminal 131 of the second solenoid valve 13 and the other end connected to the pressure sensor 14, and electrically connected to the control unit 17. The third solenoid valve 46 can close the pressure sensor 15 and the pressure testing terminal 20 based on control of the control unit 17. In particular, during a positive or negative pressure test to the object 2, when the control unit 17 finds that the pressure state of the object 2 sensed by the pressure sensor 14 meets the target pressure value, it controls the third solenoid valve 46 to operate so as to close the air-extracting path and the air-exhausting path to the object, thereby allowing a pressure maintaining step as shown in FIG. 2 to be performed to the object. After a preset time duration, if the pressure value of the object 2 sensed by the pressure sensor 14 falls within the preset upper and lower pressure limits, it represents the object 2 passes the pressure test.

Therefore, the pressure testing device of the present invention is capable of providing negative and positive pressure tests through a single vacuum pump, and further provides an operation interface that allows the user to set testing parameters, easily obtain testing results and efficiently store the testing results.

The above-described descriptions of the detailed embodiments are intended to illustrate the preferred implementation according to the present invention but are not intended to limit the scope of the present invention. Accordingly, all modifications and variations completed by those with ordinary skill in the art should fall within the scope of present invention defined by the appended claims.

What is claimed is:

1. A pressure testing device for performing one of a positive pressure test and a negative pressure test to an object at a pressure testing terminal thereof according to pressure testing parameters, comprising:

a vacuum pump having a negative pressure terminal and a positive pressure terminal for extracting air at the negative pressure terminal and exhausting air at the positive pressure terminal;

a first solenoid valve having a first intake terminal and a first exhaust terminal, wherein the first exhaust terminal is connected to the negative pressure terminal of the vacuum pump;

a second solenoid valve having a second intake terminal and a second exhaust terminal, wherein the second intake terminal is connected to the positive pressure terminal of the vacuum pump;

a pressure sensor having one end connected to the first intake terminal of the first solenoid valve and the second exhaust terminal of the second solenoid valve and the other end connected to the pressure testing terminal of the object, the pressure sensor being used for transferring one of pressures produced at the first intake terminal and the second exhaust terminal to the pressure testing terminal and sensing pressure state of the object through the pressure testing terminal;

an operation module for displaying an operation interface to input the pressure testing parameters; and a control unit electrically connected to the vacuum pump, the first solenoid valve, the second solenoid valve, the pressure sensor and the operation module for performing one of the positive pressure test and the negative pressure test to the object according to the pressure testing parameters received by the operation module, wherein, if the pressure testing parameters belong to a negative pressure test, the control unit controls the vacuum pump and the first solenoid valve to perform an air-extracting process to the object and controls the operation module to display on the operation interface the pressure state of the object sensed by the pressure sensor, on the other hand, if the pressure testing parameters belong to a positive pressure test, the control unit controls the vacuum pump and the second solenoid valve to perform an air-exhausting process to the object and controls the operation module to display on the operation interface the pressure state of the object sensed by the pressure sensor.

2. The device of claim 1, further comprising a negative pressure regulating valve disposed in the air-extracting path formed between the first solenoid valve and the pressure sensor and electrically connected to the control unit for regulating the negative pressure in the air-extracting path according to the pressure testing parameters.

3. The device of claim 1, further comprising a filter disposed between the pressure sensor and the pressure testing terminal for filtering out impurities in the path between the pressure sensor and the pressure testing terminal.

4. The apparatus of claim 1, further comprising a storage unit disposed between the second exhaust terminal of the second solenoid valve and the pressure sensor for storing air exhausted from the vacuum pump through the second solenoid valve and performing an air-exhausting process to the object, and further comprising a pressure switch connected to the storage unit for enabling or disabling an air exhaust from the vacuum pump to the storage unit.

5. The device of claim 1, further comprising a positive pressure regulating valve disposed in the air-exhausting path formed between the second solenoid valve and the pressure sensor and electrically connected to the control unit for regulating the positive pressure in the air-exhausting path according to the pressure testing parameters.

6. The device of claim 1, wherein the pressure testing parameters belonging to a positive pressure test comprise at least one of the group consisting of an upper time limit for performing an air-exhausting process to the object, a target pressure value, time duration to maintain pressure after the air-exhausting process, and upper and lower pressure limit values for the object.

7. The device of claim 6, wherein the operation interface displays at least one of the group consisting of the pressure state of the object after the air-exhausting process, progress of the air-exhausting process, progress for the object to maintain pressure after the air-exhausting process, and testing result of succeeding or failing.

8. The device of claim 1, wherein the pressure testing parameters belonging to a negative pressure test comprise at least one of the group consisting of an upper time limit for performing an air-extracting process to the object, a target pressure value, time duration to maintain pressure after the air-extracting process, and upper and lower pressure limit values for the object.

9. The device of claim 8, wherein the operation interface displays at least one of the group consisting of the pressure state of the object after the air-extracting process, progress of the air-extracting process, progress for the object to maintain pressure after the air-extracting process, and testing result of succeeding or failing.

10. The device of claim 1, further comprising a third solenoid valve having one end connected to the first intake terminal and the second exhaust terminal and the other end connected to the pressure sensor and electrically connected the control unit for closing the pressure sensor and the pressure testing terminal based on control of the control unit.

* * * * *